(12) United States Patent
Blom et al.

(10) Patent No.: US 7,660,417 B2
(45) Date of Patent: Feb. 9, 2010

(54) ENHANCED SECURITY DESIGN FOR CRYPTOGRAPHY IN MOBILE COMMUNICATION SYSTEMS

(75) Inventors: Rolf Blom, Järfälla (SE); Näslund Mats, Vällingby (SE); Jari Arkko, Kaunianen (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 827 days.

(21) Appl. No.: 10/937,873

(22) Filed: Sep. 10, 2004

(65) Prior Publication Data

US 2005/0111666 A1    May 26, 2005

(51) Int. Cl.
H04K 1/00 (2006.01)
H04L 9/16 (2006.01)
(52) U.S. Cl. .................... 380/249; 380/247; 380/44
(58) Field of Classification Search ............... 380/270, 380/273, 44–46, 247–249, 259, 260, 262; 713/168, 171; 455/403, 410, 411, 422.1
See application file for complete search history.

(56) References Cited

U.S. PATENT DOCUMENTS

| 7,065,340 | B1 * | 6/2006 | Einola et al. ............ 455/410 |
| 2002/0046343 | A1 * | 4/2002 | Deo et al. ............... 713/189 |
| 2002/0066011 | A1 * | 5/2002 | Vialen et al. ............. 713/150 |
| 2003/0159067 | A1 | 8/2003 | Stirbu | |

FOREIGN PATENT DOCUMENTS

EP    1 168 870 A1    1/2002

WO    03/094438 A1    11/2003

OTHER PUBLICATIONS

Barkan et al, "Instant Ciphertext-Only Cryptanalysis of GSM Encrypted Communication", Technion-Computer Science Dept., Technical Report CS-2003-05, 2003.
3GPP TSG SA WG3 Security, "Enhanced Security of A/Gb", S3-030361, Jul. 15-18, 2003, San Francisco, CA.
3GPP TGS SA WG3 Security, "Cipher Key Separation for A/Gb Security Enhancements", S3-030463, Jul. 15-18, 2003, San Francisco, CA.
International Search Report mailed Dec. 22, 2004 in corresponding PCT application No. PCT/SE2004-001300.
Chinese Office Action dated Jul. 31, 2009 (3 pages).

* cited by examiner

*Primary Examiner*—Kimyen Vu
*Assistant Examiner*—Edward Zee
(74) *Attorney, Agent, or Firm*—Nixon & Vanderhye P.C.

(57) ABSTRACT

A basic idea according to the invention is to enhance or update the basic cryptographic security algorithms by an algorithm-specific modification of the security key information generated in the normal key agreement procedure of the mobile communication system. For communication with the mobile terminal, the network side normally selects an enhanced version of one of the basic cryptographic security algorithms supported by the mobile, and transmits information representative of the selected algorithm to the mobile terminal. The basic security key resulting from the key agreement procedure (AKA, 10) between the mobile terminal and the network is then modified (22) in dependence on the selected algorithm to generate an algorithm-specific security key. The basic security algorithm (24) is then applied with this algorithm-specific security key as key input to enhance security for protected communication in the mobile communications network.

27 Claims, 7 Drawing Sheets

ENHANCED SECURITY DESIGN FOR CRYPTOGRAPHY IN MOBILE COMMUNICATION SYSTEMS

TECHNICAL FIELD

The technical field of the disclosure generally relates to cryptographic issues in communication systems, and more particularly to security enhancements for GSM (Global System for Mobile communication), UMTS (Universal Mobile Telecommunications System) and similar communication systems.

BACKGROUND

In mobile communications, e.g. according to the GSM or UMTS standard, security is of utmost importance. This is very much related to the increased use of mobile communications in business relations and for private communication. It is now known that for example GSM suffers from security problems. As recently described in reference [1], it is possible to retrieve the encryption key by breaking the A5/2 cryptographic algorithm. There are three basic algorithm choices for circuit switched data, A5/1, A5/2, A5/3 and three basic algorithms for packet data, GEA1, GEA2 and GEA3. It should however be noted that there are also stronger 128-bit algorithms denoted A5/4 and GEA4. The terminal signals its capabilities, in particular the set of crypto algorithms it supports, to the network. The network then selects which crypto algorithm to use. Note that this signaling is unprotected. Thus the terminal has no chance to detect if and when an attacker is signaling that it should use A5/2 and that this information originates from a legitimate operator.

Generally, there are at least three types of attacks. The first type involves an attacker that intercepts and decrypts traffic when the system is using the broken A5/2 algorithm.

The second type of attack comprises interception of traffic associated with the AKA procedure to record traffic data and the RAND value that is used. Later, a false base station can make the mobile terminal execute an AKA procedure using the previously recorded RAND and then encrypt the traffic using the A5/2 algorithm, which enables the attacker to retrieve the crypto key Kc. Due to the simple dependence on RAND this key, Kc, will be the same key as was used to protect the recorded traffic.

The third type of attack involves an active man-in-the-middle forcing the terminal to use the A5/2 algorithm, thereby enabling calculation of the crypto key.

The UMTS standard advises methods that overcome most of these problems. However, a scenario is foreseen in which GSM terminals will be used during a considerable period of time until UMTS terminals have become property of the great majority of users. In fact, many advanced services will be available on GSM phones and users may be reluctant to exchange their phones until at a later time.

In addition, while UMTS has countermeasures that make it resistant to these attacks, there is of course a worry that future advances in crypto-analysis discover that similar problems exist also there and/or in other communication systems. Moreover, there could be security problems involved when roaming between different types of networks, such as GSM and UMTS networks.

SUMMARY

One or more embodiments of the. present invention overcomes these and other drawbacks of the prior art arrangements.

It is a general object to provide an enhanced security design for communication systems.

In particular, it is an object to provide security enhancements for encrypted communication that is based on key agreements in mobile communication systems such as GSM and UMTS.

It is a special object to improve key management for GSM and UMTS to limit the impact of the breaking of A5/2 and future attacks on other algorithms.

It has been recognized that a main flaw in the prior art security designs is that although the cryptographic security key depends on some random challenge, the same key is used independent of the actual security algorithm. A basic idea is to enhance or update the basic cryptographic security algorithms by an algorithm-specific modification of the security key generated in the normal key agreement procedure of the mobile communication system.

For communication between the mobile terminal and the network side, an enhanced version of one of the basic cryptographic security algorithms supported by the mobile is normally selected, either by the network side or based on a mutual agreement between the mobile and the network side. The basic security key resulting from the key agreement procedure between the mobile terminal and the network is then modified in dependence on information representative of the selected algorithm to generate an algorithm-specific security key. The basic security algorithm is finally applied with the algorithm-specific security key as key input to enhance security for protected communication in the mobile communications network.

As mentioned, the algorithm selection may be performed on the network side, in which case the network side transmits information representative of the selected algorithm to the mobile terminal. This solution is for example consistent with GSM of today, where the A5/1 to A5/3 algorithms are selected by the network.

Alternatively, however, especially for other communication systems, the selection of enhanced security algorithm according to an embodiment of the invention may, if desired, be based on an agreement between the mobile terminal and the network side, e.g. performed by means of a handshake procedure, answer-offer or similar negotiation protocol.

Preferably, the original hardware-implemented algorithms remain the same (at least in the mobile terminal), and for each original algorithm that needs security enhancement, an updated (virtual) security algorithm such as an enhanced ciphering/crypto algorithm is defined based on the original algorithm together with the algorithm-specific key modification. The key modification is typically realized by a key-modifying function, which processes the input key based on an algorithm identifier or similar information representative of the selected algorithm and perhaps some additional data to generate a modified key, which is forwarded to the original security algorithm.

If it is desirable to support not only the enhanced versions of the security algorithms but also maintain support for the basic algorithms, e.g. for interoperability purposes, the algorithm identifier has to be able to distinguish between the original basic security algorithms and the enhanced security algorithms.

In practice, the basic solution only requires software updates in the terminals and/or in the network system. In one embodiment of the invention, the problem is basically solved by modifying the terminals and letting them signal that they (only) support updated enhanced versions of the original basic algorithms. Standardization efforts can be kept to a minimum, since only the modifying function and the algorithm identifiers need to be standardized.

On the network side, the algorithm selection, key modification and cryptographic security processing such as ciphering may be implemented in a single node, or distributed over several nodes. Often, algorithm selection and key modification is implemented in the same node. Alternatively, however, the algorithm selection and key modification may be distributed over more than one network node if desired. For example, one node may calculate algorithm-specific keys for a whole set of security algorithms and transfer the keys to another node, which then selects an enhanced version of a security algorithm and extracts or derives the appropriate key from the received set of keys. Depending on the system implementation, the actual ciphering or other security processing may be performed in the same node in which the key was derived or in a separate node.

An aspect of the invention also provides support for replay protection, basic network authentication and/or secure algorithm selection, preferably based on encoding or embedding information into existing AKA information such as the random challenge used in the AKA procedure with the mobile terminal. Network authentication is preferably accomplished by embedding key-dependent authentication information such as a MAC (Message Authentication Code) that can be verified by the mobile terminal. By calculating the MAC over replay protection information and/or information on the algorithms allowed by the home network, this information will receive some integrity protection, resulting in secure replay protection and/or secure algorithm selection.

Although the currently most urgent problem concerns broken GSM algorithms, it is clear that the key modification is useful not only in GSM, but also in UMTS, CDMA or future generation systems, to proactively ensure that similar (perhaps yet undiscovered) problems will not show up later, since the key derivation there is currently also algorithm-independent. In effect, one or more embodiments of the invention are applicable in various communications systems, e.g. including GSM/GPRS, W-LAN (Wireless Local Area Network), UMTS and IMS (IP Multimedia Subsystem) systems.

The various aspects of the invention thus provide remedies to a basic security design flaw in e.g. the GSM/UMTS AKA procedures. The proposed solution fits nicely into the existing protocol framework and has limited implementation consequences which makes a rapid deployment possible.

The embodiment(s) of the invention offer(s) the following advantages:

Efficient solution to a basic security design flaw;
It is sufficient to modify the key, while allowing the original algorithms implemented in hardware to remain the same;
Minimal standardization effort;
Fits nicely into the existing protocol framework; and
Limited implementation consequences, which makes a rapid deployment possible.

Other advantages offered will be appreciated upon reading of the below description of the embodiments of the invention.

BRIEF DESCRIPTION OF THE DRAWINGS

The invention, together with further objects and advantages thereof, will be best understood by reference to the following description taken together with the accompanying drawings, in which.

DETAILED DESCRIPTION

It may be useful to begin with a brief analysis of the basic security flaws in GSM. One flaw in the conventional design is that the key used for all algorithms is derived in the same way independent of the ciphering algorithm to be used. If this hadn't been the case, breaking of A5/2 would have meant just that, and the type 2 and 3 attacks mentioned in the background section could not have been used to intercept traffic protected with other algorithms.

Furthermore the seriousness of the design error is increased by the fact that the signaling is unprotected (there is no network authentication and consequently no integrity or replay protection). As mentioned, this is corrected in UMTS. It might seem that improving the security of GSM to that of UMTS will fix the problems. However, this requires modifications to AuC (Authentication Center), base stations, terminals and SIM (Subscriber Identity Module) cards, and this would be a very costly way of solving the problems.

Figure 1:
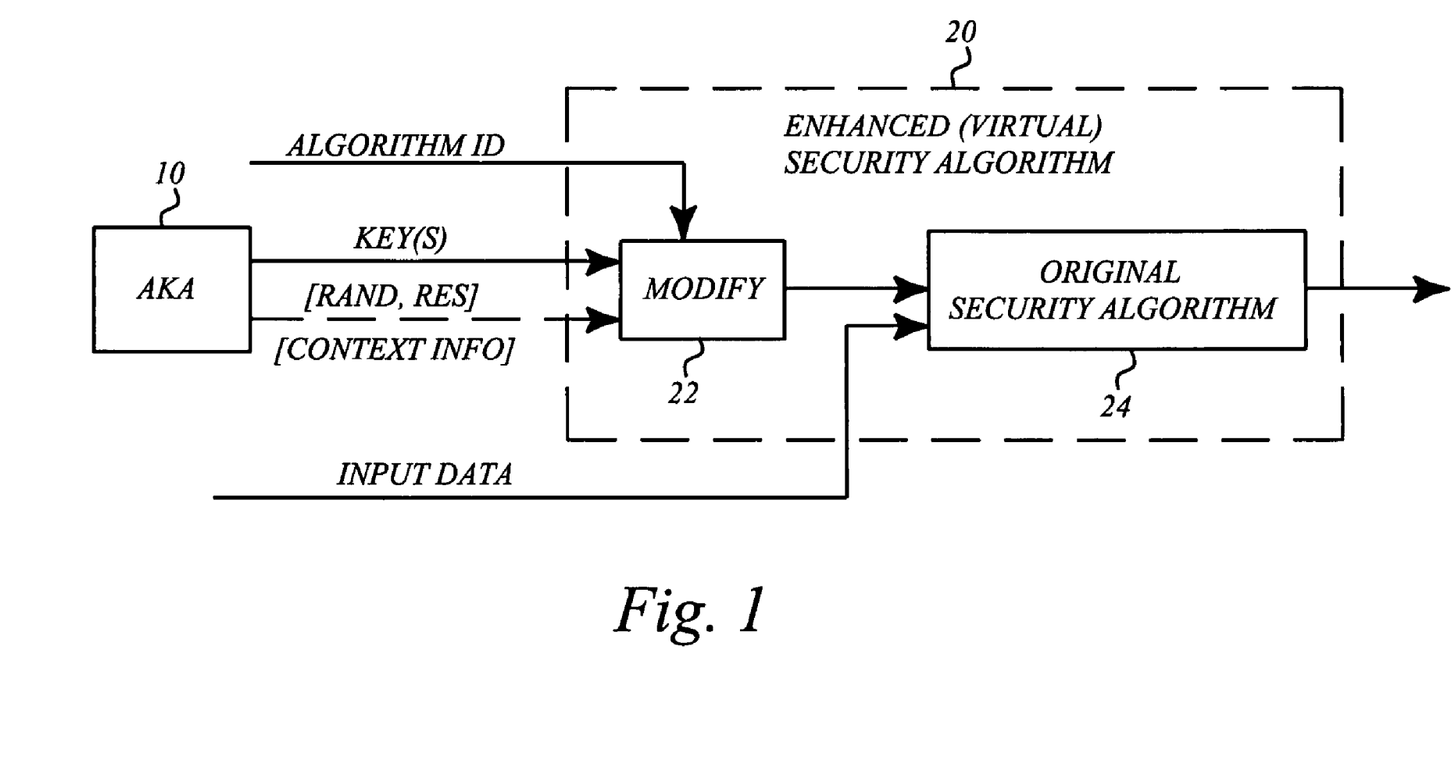
FIG. 1 is a schematic block diagram illustrating a basic solution according to an example embodiment of the invention with an overall algorithm defined by a algorithm-specific key modification in combination with an original basic crypto algorithm.

One or more embodiments on the other hand provide a remedy to this type of security flaws, primarily based on algorithm-specific modification of the AKA keying material. With reference to FIG. 1, it can be seen that the keying material provided by the standard AKA procedure 10 is used as input to an enhanced security algorithm 20, which is formed by e key modification 22 in combination with an original security algorithm 24. In order to ensure algorithm-dependent keying material as output from the modify unit, information representing or otherwise identifying a selected algorithm is applied as input to the modify unit. Although the security of underlying basic algorithms may not be increased as such, the key material is not so useful for attacks on any of the other algorithms. The key modification is normally performed by a cryptographic modify function, which at least should be a one-way function and preferably a pseudo-random function. For example, the cryptographic modify function may be implemented as a cryptographic hash function. Other AKA-related information, such as RAND and RES from the AKA procedure, may optionally be introduced to make pre-calculation attacks infeasible, and optional context information may also be introduced if other types of bidding-down attacks can be identified.

The security processing of the security algorithms is typically related to data confidentiality and ciphering, but may alternatively be concerned with data integrity and/or authentication.

The key modification can be regarded as an algorithm pre-processing, but can also be seen as an AKA post-processing, in which the output key from the standard AKA procedure is post-processed to produce an algorithm-dependent key. This is merely a matter of definition.

Figure 2:
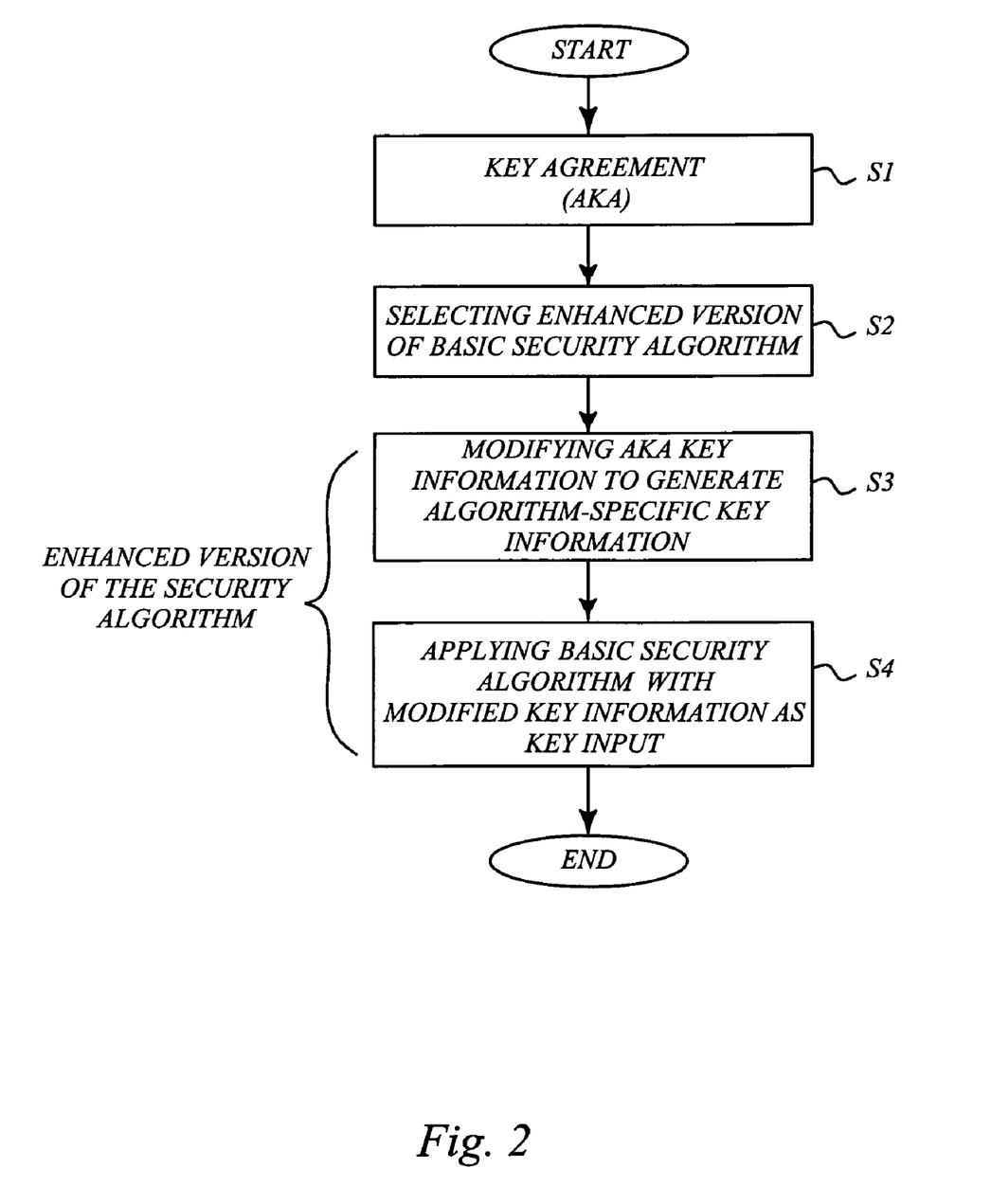
FIG. 2 is a schematic flow diagram of a method for enhancing security for protected communication in a mobile communications system according to an embodiment of the invention.

FIG. 2 is a schematic flow diagram of a method for enhancing security for protected communication in a mobile communications system according to an embodiment of the invention. In step S1, a key agreement procedure, usually as part of a complete AKA procedure involving also authentication of the mobile terminal, is performed. In step S2, an enhanced version or upgrade of one of the basic security algorithms is selected, on the network side or based on a mutual agreement between the mobile terminal and the network side. As previously indicated, the enhanced security algorithms are often security-enhanced ciphering/crypto algorithms, although other types of security processing may be of interest. If the algorithm is selected on the network side, information representative of the selected algorithm is transmitted from the network side to the mobile terminal. In this case, if the mobile is in the home network, the algorithm selection is usually made by the home network. If the mobile roams in a visited network, the visited network usually makes the algorithm selection according to some predetermined policy. The selection made by the visited network may finally be checked against a security policy of the home network such that the selected algorithm is accepted by the home network. Alternatively, a negotiation between the mobile terminal and the network side is performed to decide which security algorithm to use, e.g. by means of a handshake procedure.

Anyway, there is finally some agreement on which security algorithm to use for protected communication with the mobile terminal. The particular order in which the algorithm agreement and the key agreement is performed is usually not critical, although it may be advantageous to perform the algorithm agreement after successful authentication of the mobile terminal. In step S3, key information, typically a basic security key, from the key agreement procedure of step S1 is modified to generate algorithm-specific key information. In step S4, the corresponding basic security algorithm is then applied with the modified and algorithm-specific key information as key input. By making the security key information algorithm-specific or algorithm-dependent, the security for the protected communication between the network and the mobile terminal is enhanced.

The algorithm-specific key modification and the use of the modified key information is preferably implemented in the mobile terminal as well as on the network side, but at least on the terminal side. Considering the great number of mobile terminals that may be affected by a broken security algorithm, it may be very advantageous to implement the key modification in software, and simply perform a software upgrade of the terminals. This means that the original hardware-implemented algorithms may remain the same, significantly limiting the implementational consequences. The key modification is typically realized by a software-implemented key-modifying function such as a one-way cryptographic hash function, which processes the input key based on an algorithm identifier and perhaps some additional data to generate a modified key, which is subsequently forwarded to the original security algorithm. Similarly, the relevant network node or nodes may be updated by means of software upgrades.

An aspect of the invention suggests a modification of the keying material produced in standard AKA procedures, such as GSM AKA and UMTS AKA, to generate algorithm-dependent keys. Although the invention is generally applicable in various communication systems including GSM, GPRS, W-LAN, CDMA, UMTS, IMS or future generation systems, the embodiments will now primarily be described in the context of GSM/GPRS and UMTS AKA procedures.

A specific example for GSM AKA:

$$Kc'=GSM\_Modify\ (Kc, Algorithm\_Id, [RAND, RES, Other\_context\_info])$$

and for UMTS:

$$Ck', Ik'=UMTS\_Modify\ (Ck, Ik, Algorithm\_Id, [RAND, RES, Other\_context\_info])$$

where the GSM_Modify ( ) and UMTS_Modify ( ) functions are cryptographic functions, for example based on MD5, SHA1 or some variant thereof, truncating to the left-most 64/128 bits, respectively. In the UMTS case, it is also possible to use some function that takes both Ck and Ik as input to produce a 256-bits output. The RAND may be introduced to make pre-calculation attacks infeasible. For inter-MSC handovers and similar handovers in other systems, the RAND is then typically transferred together with the standard handover information from the old MSC to the new MSC.

In the following, the various embodiments of the invention will primarily be described with reference to the scenario in which the algorithm selection is performed on the network side. It should however be understood that it is equally feasible to implement a basic hand-shake procedure or similar negotiation mechanism in which the mobile terminal and the network side agrees on which security algorithm to use for the protected communication.

Figure 3:
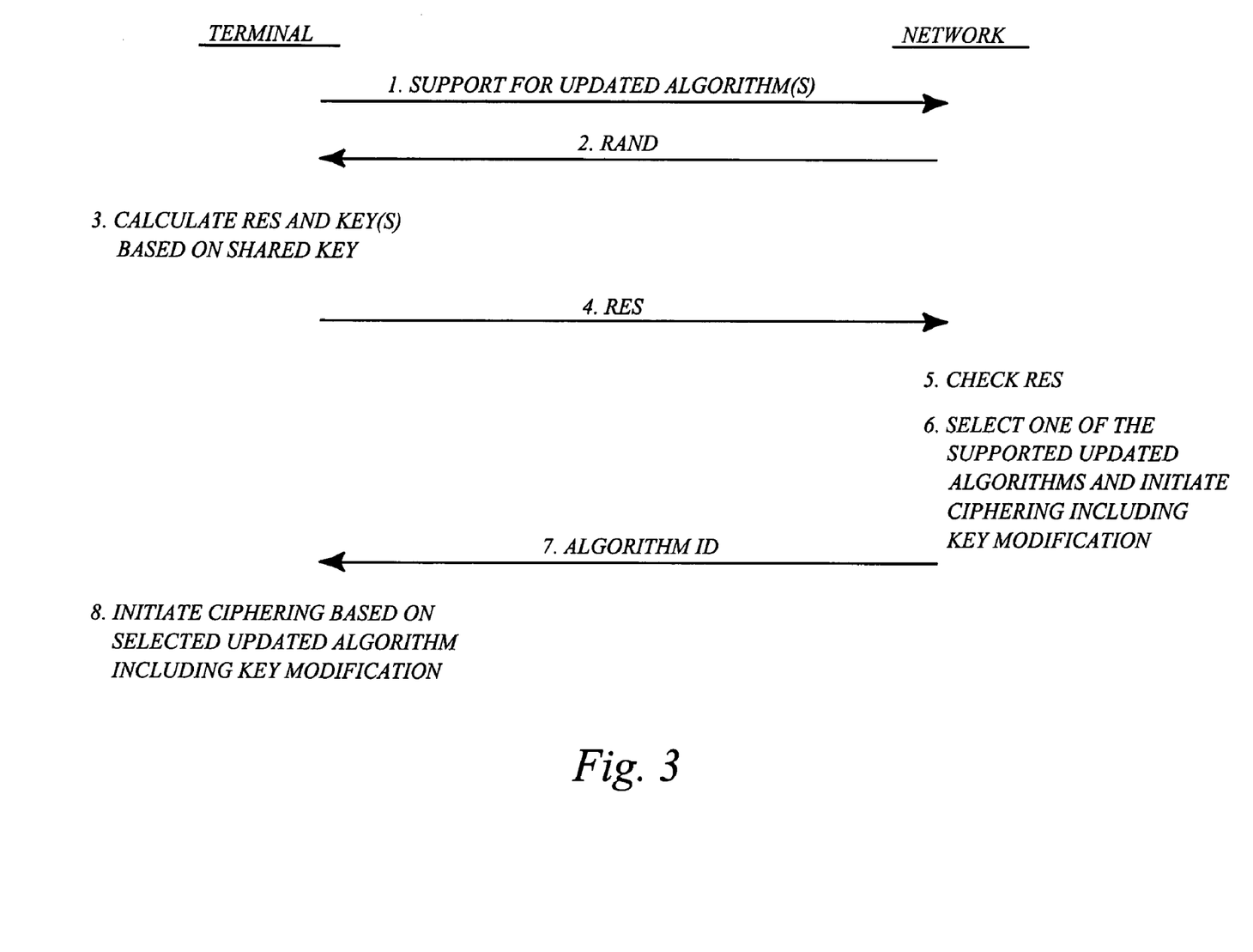
FIG. 3 is a schematic basic signal diagram according to an embodiment of the invention.

It may be useful to describe the general signaling between terminal and network side according to an embodiment of the invention, referring to FIG. 3.

1. The terminal signals which updated algorithms that it supports, as well as a user or subscriber ID.

The network side (involving the home network and/or visited network and when required by a conventional AKA procedure) initiates authentication and key agreement by creating a RAND, calculating an expected response and one or more keys. Based on the subscriber ID, the relevant shared secret subscriber key can be retrieved on the network side to enable the AKA calculations.

2. The network sends RAND to the terminal.
3. The terminal enters RAND into the GSM SIM, UMTS SIM, ISIM or similar functionality and gets, based on a shared subscriber key, a response RES and one or more keys.
4. The terminal sends RES to the network side.
5. The network side checks RES to authenticate the terminal. When the mobile is in the home network, the home network checks the RES against an expected response XRES. When the mobile terminal is in a visited network, the visited network normally checks the RES by comparison with XRES received from the home network. In GSM terminology, RES and XRES are normally both referred to as SRES.
6. In this example, the network side (home network or visited network depending on where the mobile is situated) preferably selects one of the updated algorithms supported by the terminal and initiates ciphering. Naturally, the network side also has to support the selected enhanced security algorithm.

7. The network side sends the algorithm ID to the terminal.
8. The terminal initiates ciphering based on the selected updated algorithm including algorithm-dependent key modification.

If it is desirable to support not only the enhanced versions of the security algorithms but also maintain support for the basic algorithms, e.g. for interoperability purposes, the algorithm identifier has to be able to distinguish between the original basic security algorithms and the enhanced security algorithms.

Table I below illustrates a possible example of algorithm identifiers for the basic GSM/GPRS crypto algorithms and a corresponding set of enhanced crypto algorithms:

|  | Algorithm ID |
| --- | --- |
| Basic security algorithms: |  |
| A5/1 | 1 |
| A5/2 | 2 |
| . | . |
| . | . |
| . | . |
| A5/k | k |
| GEA1 | k + 1 |
| GEA2 | k + 2 |
| . | . |
| . | . |
| . | . |
| GEAm | k + m |
| Enhanced security algorithms: |  |
| A5/1' | (k + m) + 1 |
| A5/2' | (k + m) + 2 |
| . | . |
| . | . |
| . | . |
| A5/k' | (k + m) + k |
| GEA1' | (k + m + k) + 1 |
| GEA2' | (k + m + k) + 2 |
| . | . |
| . | . |
| . | . |
| GEAm' | (k + m + k) + m |

New enhanced crypto algorithms, here represented by A5/1', A5/2', . . . , A5/k', . . . , GEA1', GEA2', . . . , GEAm' for the particular case of GSM and GPRS ciphering, have thus been defined. For generality, it is assumed that there are a number, k, of A5 algorithms and a number, m, of GEA algorithms, where normally k=m=4. As previously described, each of the enhanced algorithms is formed by algorithm-specific key modification in combination with the corresponding basic algorithm. If the network for some reason selects a basic security algorithm, the AKA key will be passed transparently without modification to the basic algorithm.

Naturally, other ways of distinguishing the algorithm identifiers may be used, e.g. based on binary or hexadecimal representations.

For example, since GSM is currently specified to support up to eight algorithms, a simple way would be to let A5/j, where j=5, 6, 7 and 8 denote A5/1', A5/2', A5/3' and A5/4', respectively. Concerning the 128-bit algorithms A5/4 and also GEA4, it may not be necessary to provide enhanced variants, since they are considered, at least presently, to be very strong.

If it is desired to support only the updated enhanced algorithms, a possible example of algorithm identifiers for the proposed enhanced GSM/GPRS crypto algorithms is given in Table II below.

| Enhanced security algorithms: | Algorithm ID |
| --- | --- |
| A5/1' | 1 |
| A5/2' | 2 |
| . | . |
| . | . |
| . | . |
| A5/k' | k |
| GEA1' | k + 1 |
| GEA2' | k + 2 |
| . | . |
| . | . |
| . | . |
| GEAm' | k + m |

An exemplary solution is to upgrade the terminals and let them signal that they only support updated version of the (current) basic algorithms. This can be done by defining new crypto algorithms, e.g. A5/1', A5/2', . . . , A5/k', GEA1', GEA2', . . . , GEAm' for the particular case of GSM and GPRS, or by an indication in the signaling of general terminal capabilities.

An example of a complete procedure can be described as:
1. The terminal signals support of A5/x', A5/y', . . . , and also sends the user or subscriber ID.
2. The network sends RAND to the terminal.
3. The terminal enters the RAND into the SIM and gets RES and Kc.
4. The terminal sends RES to the network.
5. The network checks RES.
6. After successful authentication, the network selects a supported algorithm, e.g. A5/y', and initiates ciphering with use of A5/y'.
7. The network sends the algorithm identifier of A5/y' to the terminal.
8. The terminal initiates ciphering with use of the updated algorithm A5/y'=(key modification and A5/y). In practice, this typically means that the terminal calculates the modified key to be used by performing Kc'=Modify (Kc, A5/y'_identifier, [RES],[RAND]) and applies the modified key Kc' to the original hardware algorithm A5/y.

As mentioned above, the modifying function should at least be a one-way function, preferably a pseudo-random function. A keyed standard cryptographic hash function like MD5, SHA-1, or some variant thereof, e.g. HMAC, can be used. If desired, it is even possible to change (increase/decrease) the size of the basic AKA key by means of the modifying function. For example, key processing and/or concatenation of key material may be employed to increase the final key size. For instance, the modification unit may invoke the SIM a second time using RAND plus a predetermined constant as a new random challenge and concatenate the first AKA key with the second AKA key to generate a new double-sized key, which may subsequently be made algorithm-specific by means of a cryptographic one-way function. Another example involves processing of the AKA key, e.g. by shifting bits, to generate a processed AKA key, which may then be concatenated with the original AKA key to increase the key size. Naturally, the modification unit may include other security enhancement functions that can be combined with the algorithm-specific key modification proposed by the invention.

Figure 4:
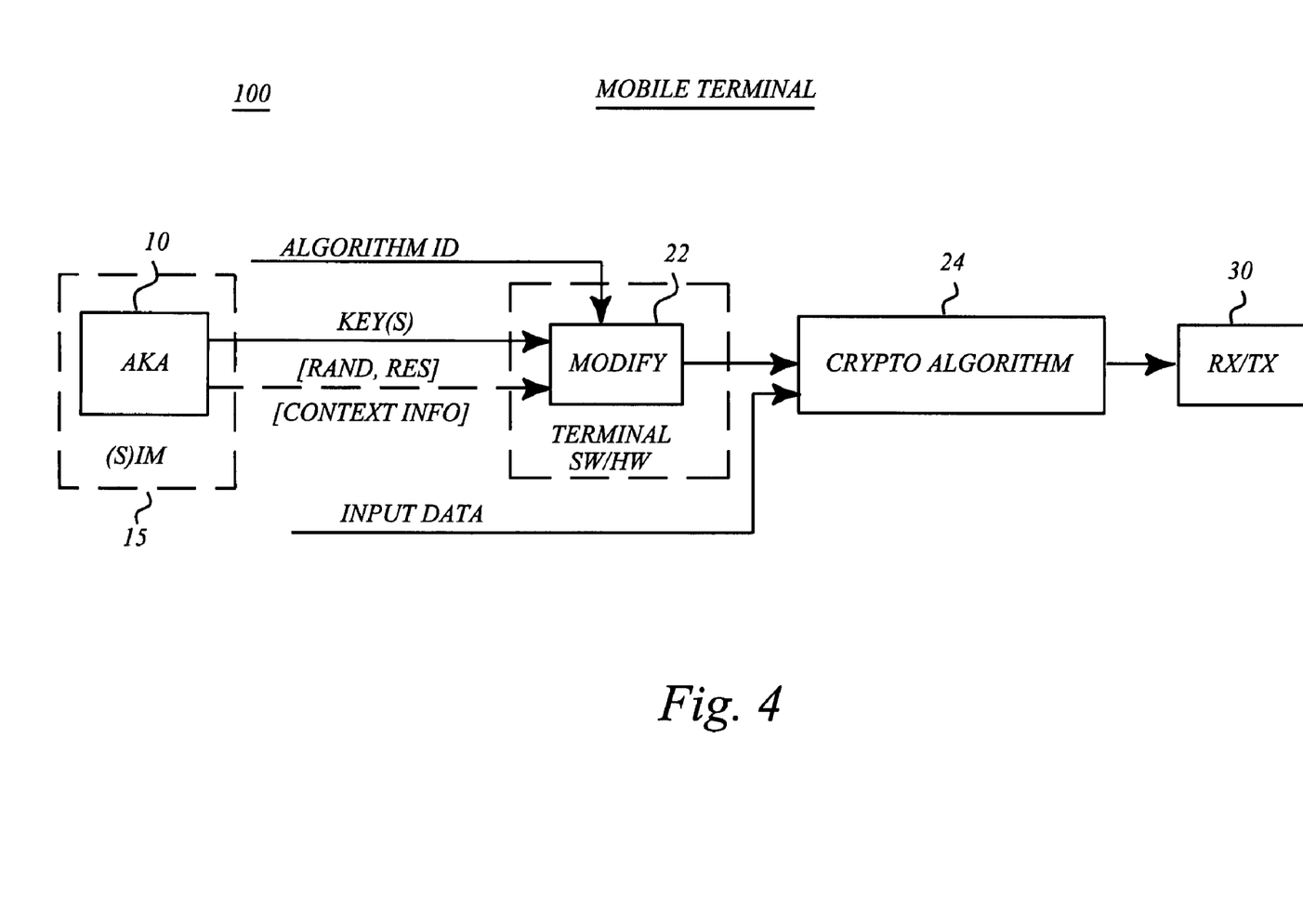
FIG. 4 is a schematic block diagram illustrating relevant parts of a mobile terminal according to an embodiment of the invention, implementing an algorithm-specific key modification.

FIG. 4 is a schematic block diagram of the relevant parts of a mobile terminal according to an embodiment of the invention, implementing an algorithm-specific key modification. Normally, the AKA functionality 10 is implemented in a standard identity module (IM) 15 such as the GSM SIM card, but may alternatively be provided elsewhere in the mobile terminal 100. The AKA output key(s) is then forwarded, optionally together with RAND, RES and/or context information, to the key modification module 22. The key modification module 22 processes the AKA output key(s) in response to an algorithm identifier representative of the selected security algorithm to generate an algorithm-specific security key. This modified key is then transferred to the basic security algorithm 24, here exemplified by a crypto algorithm, such as e.g. any of the original A5/1, A5/2, A5/3, GEA1, GEA2 and GRA3 algorithms. Of course, the basic security algorithm 24 also receives the information to be protected by the security algorithm. In the case of encryption, so-called "clear text" data is encrypted by the security algorithm based on the algorithm-specific security key to generate encrypted output data. The key modification module 22 is normally implemented as terminal software/hardware, preferably by using the general terminal capabilities of the mobile 100. As mentioned, it is advantageous to implement the key modification as a software upgrade based on a suitable cryptographic modify function for execution by terminal processing hardware. However, if some mobile designer/manufacturer wants all cryptographic functions to be in hardware, there is nothing that prevents a hardware implementation of the key modification. For example, new GSM phones may be provided with an additional key modification hardware module that is arranged for cooperation with the AKA module and the ordinary basic cryptographic ciphering algorithm. The crypto algorithm 24 is typically realized in terminal hardware, preferably close to the RN/TX chain 30. The identity module 15 can be any tamper-resistant identity module known to the art, including standard SIM cards used in GSM (Global System for Mobile Communications) mobile telephones, UMTS (Universal Mobile Telecommunications System) SIM (USIM), WAP (Wireless Application Protocol) SIM, also known as WIM, ISIM (IP Multimedia Subsystem Identity Module) and, more generally, UICC (Universal Integrated Circuit Card) modules. The AKA functionality does not necessarily have to be implemented in an identity module, or at least not in a hardware module such as the ordinary SIM. It is even possible to emulate an entire identity module including AKA functionality in software.

As mentioned, the embodiments are applicable both when the mobile terminal is in its home network and when it roams in a visited network, as long as the home network and the visited network, respectively, supports the enhanced security algorithms (it is sufficient that the home network is aware of the existence of the algorithms). Since the latter case, when the mobile roams into a visited network, is somewhat more complex, we will briefly describe an exemplary network architecture including both a home network and a visited network with reference to FIG. 5. In addition to a general network architecture, FIG. 5 also illustrates the involved nodes for each of a number of exemplary communication systems.

Figure 5:
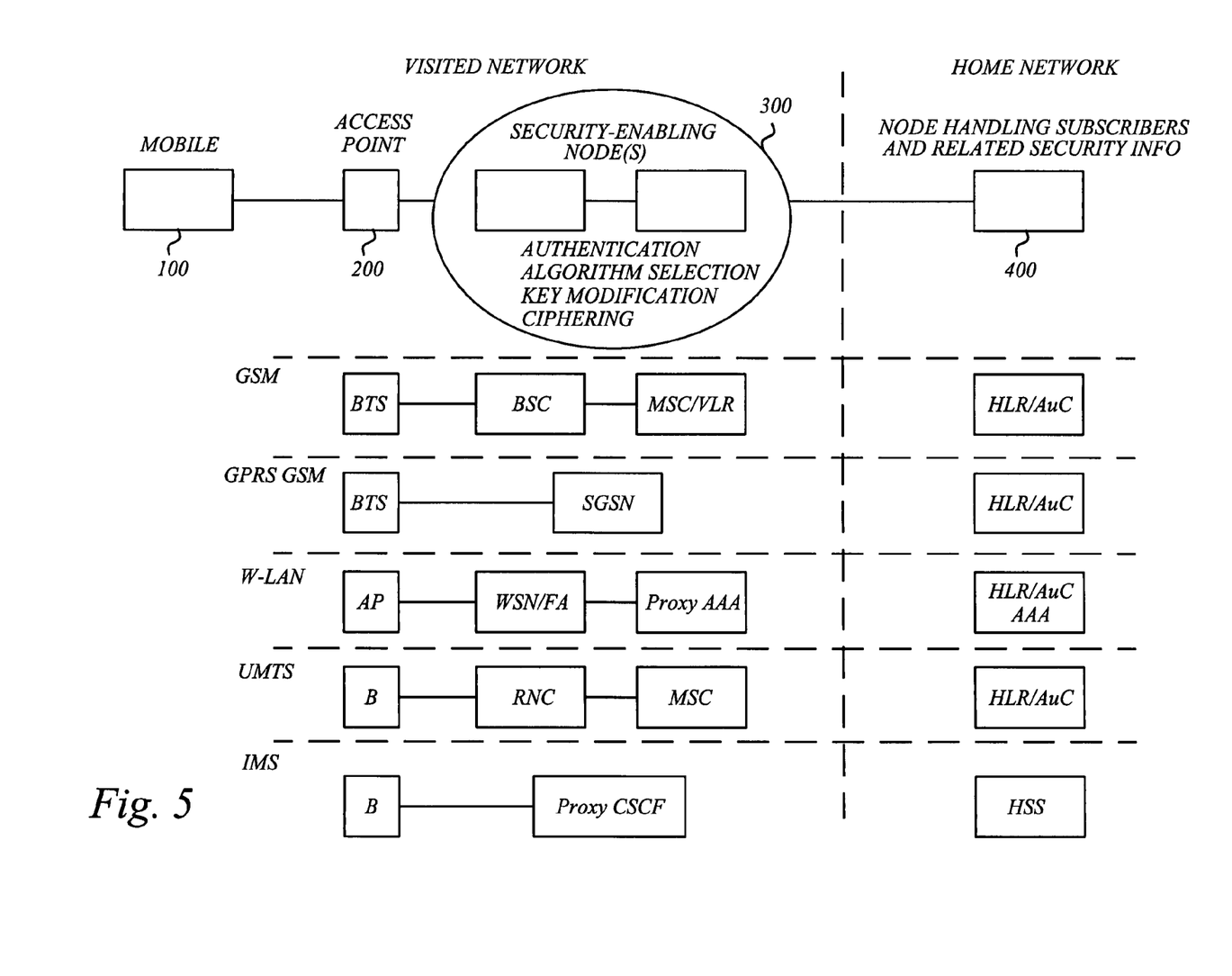
FIG. 5 illustrates an exemplary network architecture, illustrating the involved nodes for different types of communication systems.

The overall network architecture includes a mobile terminal 100, a network access point 200, one or more so-called security-enabling nodes 300 in the visited network and one or more subscriber-handling network nodes 400 in the home network. The network access point may for example be a BTS (Base Transceiver Station) node, a node B or a W-LAN access point, depending on the considered communication system. Basically, the security-enabling nodes 300 in the visited network provide support for user authentication, in which mobile terminals authenticate towards the network in order to gain access to the network services. This authentication may also serve as a base for billing the users. The basic security protocols of modern communication systems normally involve a challenge-response authentication and key agreement (AKA) procedure. The AKA procedure is most often based on symmetric cryptography using a secret key shared between the mobile terminal and the home network, as previously described. In the mobile terminal 100, the shared secret key is normally stored in a subscriber identity module such as the GSM SIM, USIM, ISIM, WIM, or more generally in a UICC. In the home network, one or more network nodes 400 handles the subscribers and related security information. The subscriber-handling node(s) 400 of the home network communicates with the security-enabling node(s) 300 in the visited network, usually transferring AKA-related information and optionally also security policy information from the home network to the visited network. In accordance with an embodiment, the security-enabling node(s) also includes functionality for selecting a suitable security algorithm for protected communication with the mobile terminal. Preferably, the security-enabling node(s) 300 is implemented with a key modification function for modifying the normal AKA output key(s) in dependence on the selected algorithm to provide support for the enhanced security algorithms. These security-enabling nodes may also include the actual cryptographic engines for security processing such as ciphering. However, in some systems such as GSM, the ciphering is implemented in the actual base transceiver station acting as the network access point.

The algorithm selection, key modification and the actual ciphering may be implemented in a single node, or distributed over several nodes. Often, algorithm selection and key modification is implemented in the same node. Alternatively, however, the algorithm selection and key modification may be distributed over multiple network nodes if desired. Depending on the system implementation, the actual ciphering or other security processing may or may not be co-located with the key generation functionality. In the latter case, the modified algorithm-specific key to be used in the ciphering algorithm may have to be transferred to a separate node, in which the ciphering is performed.

For a GSM system, the security-enabling nodes typically correspond to the BSC (Base Station Controller) and the MSC/VLR (Mobile Switching Center/Visited Location Register). On the home network side, the HLR/AuC (Home Location Register/Authentication Center) of the GSM network will normally handle subscribers and security-related information. The subscriber-handling network node(s) 300 may naturally be a home operator HLR/AuC, possibly involving an AAA (Authorization, Authentication and Accounting) server that may or may not be co-located with the authentication center. However, it may also be a broker acting as a general authentication center, or identity center, for a number of different network operators. Basically, on the network side the proposed solution only requires extension of the algorithm identifiers and implementation of an algorithm-specific key modification in a suitable place in the BSC or in the MSC/VLR. In GSM, the actual ciphering is executed in the BTS base station. This means that the modified key has to be forwarded from the BSC to the base station for the actual ciphering. Hence, the BTS may also be considered as part of the security-enabling node(s). Standard authentication and key agreement parameters are typically obtained from the HLR/AuC.

For a GPRS/GSM system, both key modification and ciphering are typically implemented in the SGSN (Serving GPRS Support Node) node, which also handles authentication of subscribers in the visited network. The GSM BSS (Base Station System) with its BTS base station thus has a more passive role in this context, compared to the pure GSM case.

For a 3GPP W-LAN system, the security-enabling nodes typically correspond to the proxy AAA node and the WSN/FA (W-LAN Serving Node), which interacts with the W-LAN Access Point (AP). Standard authentication and key agreement parameters are obtained from the HLR/AuC and an AAA server.

For a UMTS system, the access point is the NodeB, and the security-enabling nodes correspond to the RNC (Radio Network Controller) and the MSC nodes. In the home network, the HLR/AuC takes care of the necessary interaction with the MSC and RNC nodes.

For an IP Multimedia sub-system, the Proxy CSCF (Call State Control Function) node corresponds to the security-enabling node, and may include algorithm-specific key modification to enhance security for application-level control signaling. In future generations of the IMS system, user data may also be protected by employing a key modification according to the invention. In the home network, a HSS (Home Subscriber System) node provides the required authentication and key agreement parameters and the Serving CSCF normally authenticates IMS subscribers.

Figure 6:
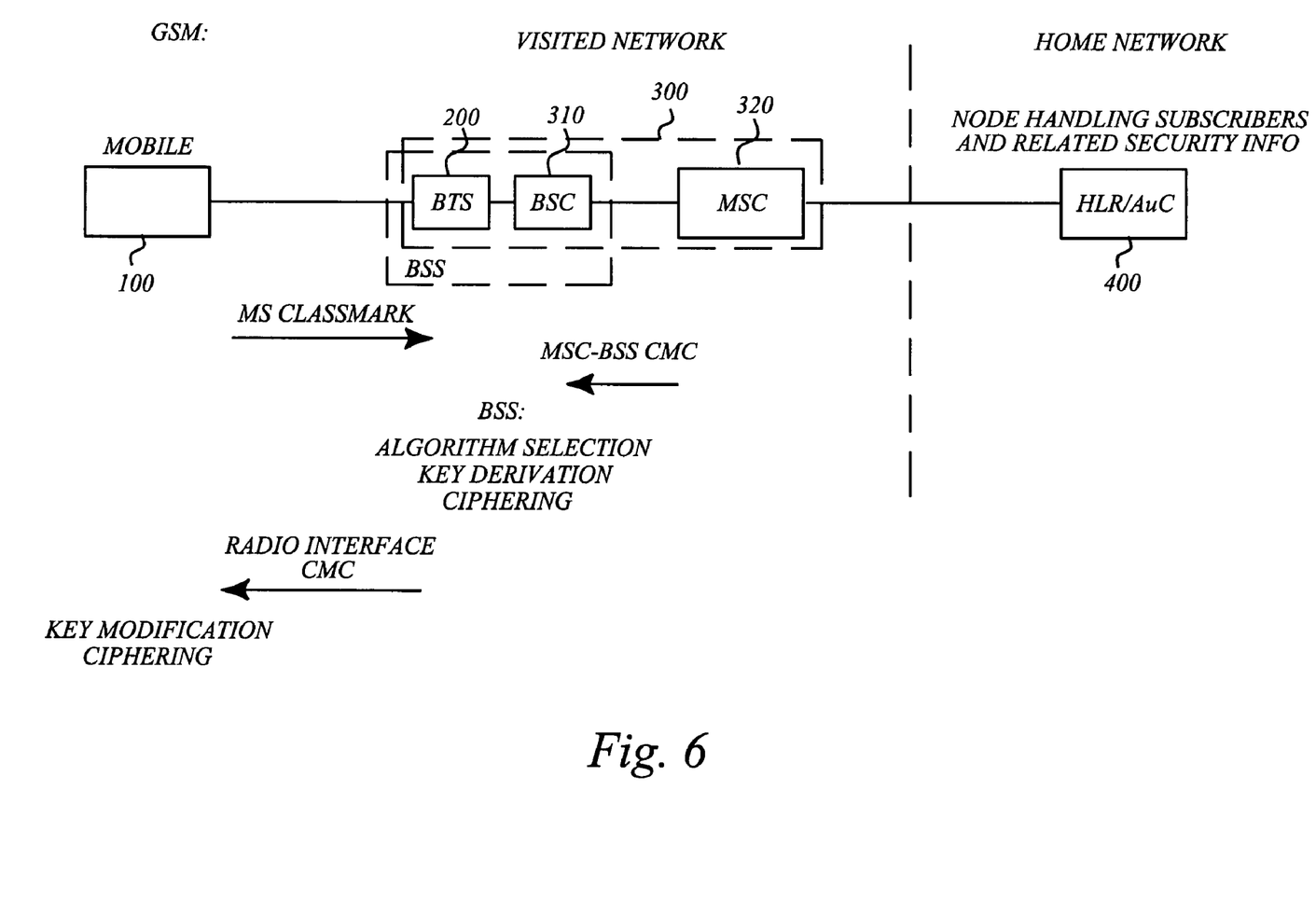
FIG. 6 is a schematic diagram illustrating an overview of the enhanced cipher mode setup and key modification procedure according to an embodiment of the invention.

FIG. 6 is a schematic diagram illustrating an overview of the enhanced cipher mode setup and key modification procedure according to an embodiment of the invention, related to the specific case of GSM. In a MS classmark similar to that standardized in TS24.008, a list of algorithms supported by the mobile is transferred from the mobile terminal 100 to the BSS (Base Station System), preferably to the BSC 310 via the BTS base station 200, assuming that the algorithm decision or negotiation takes place in the BSC. The list of supported algorithms preferably includes at least the enhanced security algorithms A5/1', A5/2', A5/3', but possibly also the basic algorithms A5/1, A5/2 and A5/3. The MSC 320 transfers a list of algorithms allowed by the security policy of the visited network to the 1355 system and more particularly to the BSC 310 in a CMC (Cipher Mode Command) command similar to that standardized in TS48.008. The BSS system, and especially the BSC 310 then normally selects an algorithm for protected communication with the mobile terminal based on the list of supported algorithms and the list of allowed algorithms and, if an enhanced security algorithm is selected, preferably derives an algorithm-specific security key. The BSS system also transmits an algorithm identifier of the selected algorithm to the mobile terminal in a radio interface CMC command similar to that standardized in TS 44.018. For example, the key derivation can be accomplished by calculating the modified key in the BSC 310 in dependence on the selected algorithm. Alternatively, the MSC 320 calculates algorithm-specific modified keys for all the algorithms allowed by the visited network and transfers them, preferably in connection with the CMC command, to the BSC, which in turn selects the algorithm and extracts the appropriate key from the calculated set of keys. In GSM, the actual ciphering is performed by the DTS base station 200 of the BSS system. The mobile terminal 100 is here provided with a key modification functionality and applies the algorithm identifier, possibly together with additional information, into the key modification function to generate a corresponding algorithm-specific key to be used for ciphering.

As previously mentioned, the algorithm selection made by the visited network may be checked against a security policy of the home network such that one can be ensured that the selected algorithm is accepted by the home network. Normally, this means that a list of algorithms allowed by the home network is transferred to the mobile terminal. This information is preferably integrity protected so that the mobile can be sure that the information has not been tampered with, as will be described later on.

The embodiment of the invention preferably also provides support for replay protection, basic network authentication and/or secure algorithm selection, preferably based on encoding or embedding information into existing AKA information such as the random challenge RAND used in the AKA procedure with the mobile terminal. If one can also accept modifications to the AuC or corresponding node on the home network side, replay protection, network authentication as well as further enhancements to the security can be achieved as will be discussed below.

The RAND value is supposed to be random, but it is possible to use a few bits of RAND to signal some additional information from the home network (AuC) to the terminal to further enhance the security. The above embodiments fix the problems with key-uniqueness per algorithm, but they do not generally remove problems with replay or lack of network authentication. The exemplary solution below accomplishes this with minimal additional changes (to the AuC and terminal only) and no new signaling.

Figure 7:
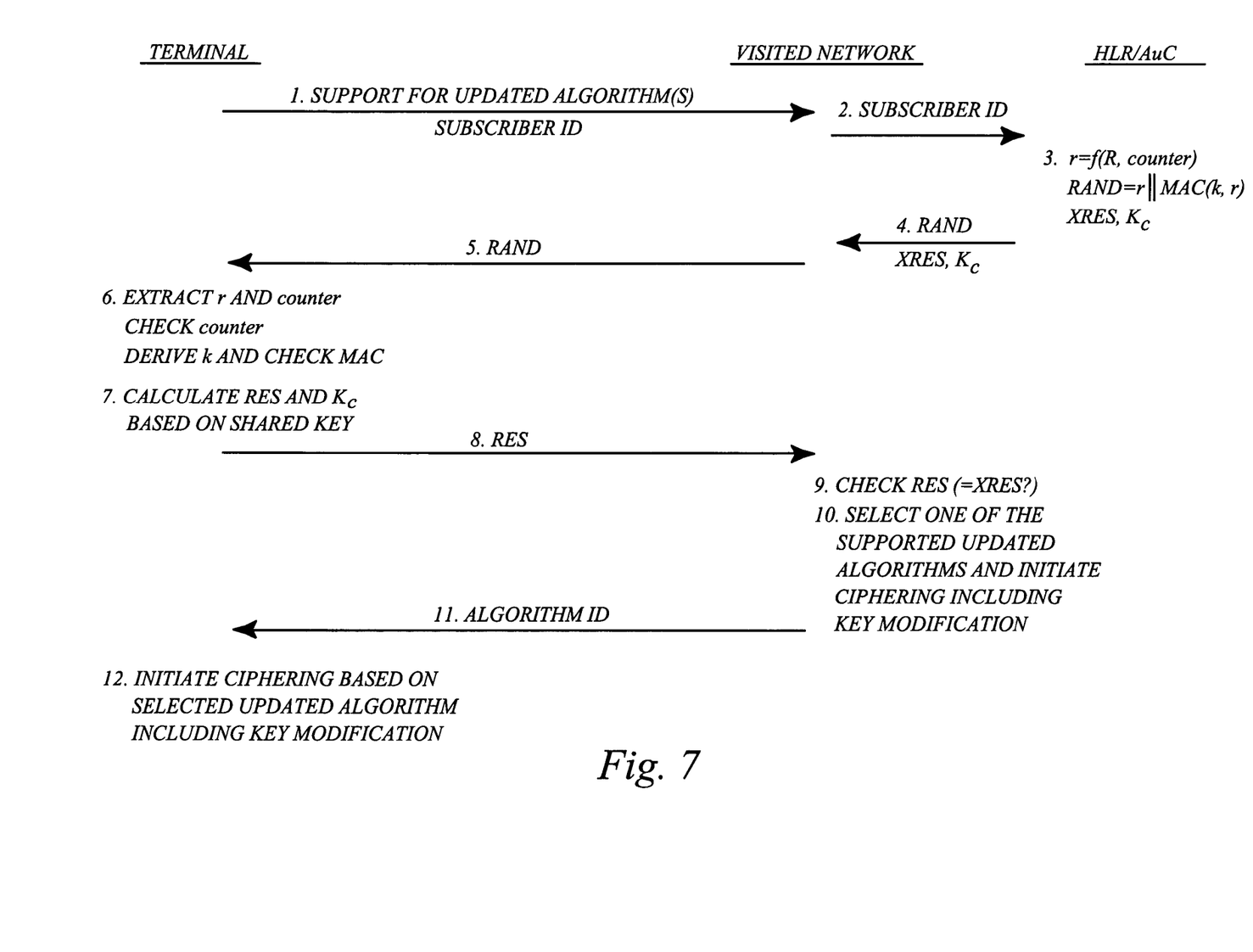
FIG. 7 is a schematic basic signal diagram according to a further example embodiment of the invention, including security algorithm enhancements with integrated replay protection and network authentication.

FIG. 7 is a schematic basic signal diagram according to another embodiment of the invention, including security algorithm enhancements with integrated replay protection and network authentication. For simplicity, the below example is related to the GSM case, but the mechanisms described are not limited thereto as will be readily understood by the skilled person.

1. The terminal signals which updated algorithms that it supports, preferably together with its subscriber ID to the visited network and the MSC/VLR node.
2. The visited network forwards the subscriber ID to the home network, and more particularly to the HLR/AuC or corresponding node.
3. In this particular embodiment, the AuC forms RAND values as follows. (Assuming that RAND is normally 128 bits in size).
   A. The AuC maintains for each mobile (SIM) a counter, $c$, of the number of authentications performed for said mobile. This counter may for example be $t=16$ bits in size, and is allowed to wrap modulo $2^{16}$. The counter c is a representative example of replay protection information.
   B. A $(128-t-m)$-bit random value R, is generated in the AuC, where m is determined below.
   C. The value $r=R\|c\|00\ldots0$ (as many zeros as required to make r 128 bits in size, i.e. m bits) is run through the GSM key generation function, obtaining a key k. Alternatively, some other padding scheme can be used. More generally, r is a function f of R and c and possibly also other optional information.
   D. The value $RAND=r\|MAC(k, r)$ is formed and is used to generate the ciphering key Kc and the expected response XRES. Here, MAC (Message Authentication Code) is a message authentication function, e.g. HMAC, truncated to m bits, e.g. $m=32$. The MAC is a representative example of network authentication information.
4-5. RAND is sent to the mobile as usual (and Kc, XRES is sent to the visited network).
6. The AuC increases c by one. On the terminal side the following actions are0 preferably performed:
   A. The mobile also maintains a counter c', of the number of authentications it has made.
   B. When the mobile receives RAND it extracts r and c from it.

C. The mobile checks that c is "ahead" (see below) of its local c' value. If not, it aborts the protocol.

D. Otherwise, the mobile then sends r to the SIM, and derives k (re-using the SIM).

E. The mobile checks whether MAC is correct by calculating XMAC(k, r) and comparing MAC and XMAC. If MAC is not correct, the mobile aborts the protocol.

F. If on the other hand the MAC is correct, the network authenticity has been verified. The mobile also updates its counter by setting c'=c.

7. The mobile invokes the SIM again, but now with the full RAND as input to obtain RES and Kc.

8. The terminal sends RES to the network side.

9. The visited network normally checks RES by comparison with XRES received from the home network, to authenticate the terminal.

10. The visited network selects one of the updated enhanced algorithms supported by the terminal and initiates ciphering.

11. The visited network sends the algorithm ID to the terminal.

12. The terminal initiates ciphering based on the selected updated algorithm including algorithm-dependent key modification.

The mobile can now communicate with the visited network. Note that due to the pseudo-random properties of the MAC function, the decrease in relative entropy of RAND is small, basically only the bits corresponding to the counter are lost.

To check if c is "ahead" we use normal sequence number arithmetic. Two t-bit values, a and b are compared as follows. If $$a > b \text{ and } a-b < 2^{\wedge}(t-1),$$

or $$a < b \text{ but } b-a > 2^{\wedge}(t-1)$$

then we say that a is "ahead" of b, otherwise it is not. An alternative solution could be to use a timestamp as replay protection information instead of a counter.

Since the MAC is calculated over r which includes the value c, there will be some integrity protection for this data as well. It is noticed that if an attacker modifies the replay protection information, the MAC can not be verified and the protocol will be aborted. Anyway, independently of whether or not a MAC is used, the RAND value will not be the same anymore, resulting in an incorrect RES that does not match the expected response XRES on the network side. Hence, there is no possibility of successful user authentication if someone has tampered with the RAND value.

Alternatively, the replay protection and network authentication aspects may be separated and executed independently of each other. For replay protection, a counter value or a timestamp may be encoded or otherwise embedded into the RAND value. For basic network authentication, key-dependent authentication information such as a MAC code or similar is calculated on the network side and transmitted to the mobile terminal for verification.

Further improvements are also possible by combining the above principles with some additional ideas that have already been proposed, e.g. in the contribution [2]. For instance, a few extra bits of RAND can be allocated for signaling a security policy from the home network to the mobile.

In an embodiment of the invention, for example, the j:th bit of RAND may be set to 1 if and only if algorithm number j (according to some agreed numbering of algorithms) is allowed to be used by the mobile. An entire list of algorithms allowed by the home network may thus be communicated embedded in the RAND. The mobile terminal can then check if the algorithm selected by the visited network is accepted by the home network. If not, the mobile terminal will abort the protocol. It is also possible and desirable to provide integrity protection by calculating a MAC over the information on security algorithms allowed by the home network.

If desired, replay protection, network authentication and secure algorithm selection can thus all be integrated, e.g. by letting the value r=R||c|| allowed algorithms ||00 . . . 0 (as many zeros as required to make r for example 128 bits in size). The value RAND=r||MAC(k, r) is formed and is used to generate the ciphering key Kc and the expected response XRES. The value r, the counter value c as well as the information on algorithms allowed by the home network are extracted by the mobile, and the MAC is checked.

An advantage of one or more embodiments of the invention is that the solution can co-exist with other proposals, including those outlined in references [2, 3]. While the proposals [2, 3] do enhance various security aspects, neither of them provides desired key-separation. This means that if algorithms X and Y are both allowed and supported, then the mobile can potentially end up running both X and Y with the same key, Kc.

Compared to the basic key modification realizations, with replay protection, network authentication and/or secure algorithm selection, the only additional node that needs modifications is the HLR/AuC on the network side. In third generation networks, the CSCF (Call State Control Function) node in the IP Multimedia sub-system needs to be updated in the basic key modification realizations, and with replay protection, network authentication and/or secure algorithm selection, the HSS (Home Subscriber System) node also requires modification.

The embodiments described above are merely given as examples, and it should be understood that the present invention is not limited thereto.

REFERENCES

[1] "Instant Ciphertext-Only Cryptanalysis of GSM Encrypted Communication" by Barkan, Biham, and Keller, Proceedings of Crypto 2003, Lecture Notes in Computer Science vol. 2729, Springer-Verlag.

[2] "Cipher key separation for A/Gb security enhancements", S3-030463, 3GPP S3#29, 15-18 Jul. 2003, San Francisco, USA.

[3] "Enhanced Security for A/Gb", S3-030361, 3GPP S3#29, 15-18 Jul. 2003, San Francisco, USA.

The invention claimed is:

1. A method of enhancing security for protected communication based on a key agreement procedure in a mobile communications network having a network side for serving a mobile terminal having at least one basic cryptographic security algorithm, said method comprising:

said mobile terminal transferring a list of at least one enhanced version, supported by said mobile terminal, of said at least one basic cryptographic security algorithm to said network side;

said network side selecting an enhanced version of said at least one basic cryptographic security algorithm for communication between said mobile terminal and said network side based on said list of at least one enhanced version, supported by said mobile terminal, of said at least one basic cryptographic security algorithm and a list of at least one enhanced version, allowed by said network side, of said at least one basic cryptographic security algorithm;

said network side transmitting information representative of said selected enhanced version of said at least one basic cryptographic security algorithm to said mobile terminal;

said mobile terminal generating an algorithm-specific security key by applying a basic security key resulting from said key agreement procedure and said information representative of said selected enhanced version of said at least one basic cryptographic security algorithm as inputs to a key-modifying function which generates said algorithm-specific security key based on said basic security key and said information applied as inputs; and said mobile terminal applying said algorithm-specific security key as key input to said at least one basic cryptographic security algorithm for protected communication between said mobile terminal and said network side of said mobile communications network, wherein said at least one basic cryptographic security algorithm together with said algorithm-specific security key correspond to said selected enhanced version of said at least one basic cryptographic security algorithm, and wherein both said basic security key and said algorithm-specific security key are valid for protected communication between said mobile terminal and said mobile communication network.

2. The method of claim 1, wherein said step of said network side selecting said enhanced version of said at least one basic cryptographic security algorithm is based on an agreement between said mobile terminal and said network side of said mobile communications network.

3. The method of claim 1, further comprising:
said network side applying said basic security key and said information representative of said selected enhanced version of said at least one basic cryptographic security algorithm as inputs to said key-modifying function to generate said algorithm-specific security key; and said network side applying said algorithm-specific security key as key input to said at least one basic cryptographic security algorithm for protected communication between said mobile terminal and said network side of said mobile communication network.

4. The method of claim 1, wherein said mobile terminal forwards said algorithm-specific security key to a cryptographic engine for said at least one basic cryptographic security algorithm in said mobile terminal.

5. The method of claim 1, wherein said information representative of said selected enhanced version of said at least one basic cryptographic security algorithm is an algorithm identifier identifying said selected enhanced version of said at least one basic cryptographic security algorithm.

6. The method of claim 1, wherein said at least one basic cryptographic security algorithm and said selected enhanced version of said at least one basic cryptographic security algorithm are configured for at least one of data confidentiality, data integrity and authentication.

7. The method of claim 6, wherein said at least one basic cryptographic security algorithm and said selected enhanced version of said at least one basic cryptographic security algorithm are configured for encrypted communication between said mobile terminal and said mobile communications network.

8. The method of claim 1, wherein said key-modifying function to generate said algorithm-specific key is performed based on a software-implemented cryptographic modify function, for execution by a processing hardware in said mobile terminal, responsive to said basic security key and an algorithm identifier representative of said selected enhanced version of said at least one basic cryptographic security algorithm.

9. The method of claim 1, wherein said key-modifying function is a one-way function.

10. An arrangement for enhancing security for protected communication based on a key agreement procedure in a mobile communications network having a network side for serving a mobile terminal having at least one basic security algorithm, said arrangement comprising:
means for transferring a list of at least one enhanced version, supported by said mobile terminal, of said at least one basic cryptographic security algorithm from said mobile terminal to said network side;

means for selecting, at said network side, an enhanced version of said at least one basic cryptographic security algorithm for communication between said mobile terminal and said network side based on said list of at least one enhanced version, supported by said mobile terminal, of said at least one basic cryptographic security algorithm and a list of at least one enhanced version, allowed by said network side, of said at least one basic cryptographic security algorithm;

means for transmitting information representative of said selected enhanced version of said at least one basic cryptographic security algorithm from said network side to said mobile terminal;

means for generating, at said mobile terminal, an algorithm-specific security key by applying a basic security key resulting from said key agreement procedure and said information representative of said selected enhanced version of said at least one basic cryptographic security algorithm as inputs to a key-modifying function which generates said algorithm-specific security key based on said basic security key and said information applied as inputs; and means for applying, at said mobile terminal, said algorithm-specific security key as key input to said at least one basic cryptographic security algorithm for protected communication between said mobile terminal and said network side in said mobile communications network, wherein said at least one basic cryptographic security algorithm together with said algorithm-specific security key correspond to said selected enhanced version of said at least one basic cryptographic security algorithm, wherein both said basic security key and said algorithm-specific security key are valid for protected communication between said mobile terminal and said mobile communication network, and wherein said arrangement comprises hardware means or a combination of hardware and software means.

11. The arrangement of claim 10, wherein said means for selecting said enhanced version of said at least one basic cryptographic security algorithm comprises means for negotiating between said mobile terminal and said network side of said mobile communications network to select said enhanced version of said at least one basic cryptographic security algorithm.

12. The arrangement of claim 10, further comprising:
means for applying, at said network side, said basic security key and said information representative of said selected enhanced version of said at least one basic cryptographic security algorithm as inputs to said key-modifying function to generate said algorithm-specific security key; and means for applying, at said network side, said algorithm-specific security key as key input to said at least one basic cryptographic security algorithm for protected communication between said mobile terminal and said network side of said mobile communications network.

13. The arrangement of claim 10, wherein said mobile terminal is configured for forwarding said algorithm-specific security key to a cryptographic engine for said at least one basic cryptographic security algorithm.

14. The arrangement of claim 10, wherein said arrangement comprises a network node configured for selecting said enhanced version of said at least one basic cryptographic security algorithm and generating said algorithm-specific security key on said network side.

15. The arrangement of claim 10,
wherein said arrangement comprises a first network node and a second network node,
wherein said first network node is configured for calculating, for each of a plurality of basic cryptographic security algorithms, a corresponding algorithm- specific security key and for transferring said calculated set of algorithm-specific security keys to said second network node, and
wherein said second network node is configured for selecting said enhanced version of said at least one basic cryptographic security algorithm and for extracting said algorithm-specific security key from said calculated set of algorithm-specific security keys.

16. The arrangement of claim 10, wherein said at least one basic cryptographic security algorithm and said selected enhanced version of said at least one basic cryptographic security algorithm are configured for encrypted communication between said mobile terminal and said mobile communications network.

17. The arrangement of claim 10, wherein said means for generating, at said mobile terminal, said algorithm-specific security key is provided as a software upgrade for execution by processing hardware in said mobile terminal.

18. The arrangement of claim 10, wherein said key-modifying function is a one-way function.

19. A mobile terminal for operation in a mobile communications network having a network side for serving said mobile terminal, said mobile terminal comprising:
an authentication and key agreement module;
an engine for supporting at least one basic cryptographic security algorithm;
means for transferring a list of at least one enhanced version of said at least one basic cryptographic security algorithm to said network side;
means for receiving, from said network side, information representative of an enhanced version of said at least one basic cryptographic security algorithm selected by said network side based on said list of at least one enhanced version of said at least one basic cryptographic security algorithm and a list of at least one enhanced version, allowed by said network side, of said at least one basic cryptographic security algorithm;
means for generating an algorithm-specific security key by applying a basic security key from said authentication and key agreement module and said information representative of said selected enhanced version of said at least one basic cryptographic security algorithm as inputs to a key-modifying function which generates said algorithm-specific security key based on said basic security key and said information applied as input; and
means for applying said algorithm-specific security key as key input to said engine for at least one basic cryptographic security algorithm for protected communication between said mobile terminal and said network side in said mobile communications network,
wherein said at least one basic cryptographic security algorithm together with said algorithm-specific security key correspond to said selected enhanced version of said at least one basic cryptographic security algorithm,
wherein both said basic security key and said algorithm-specific security key are valid for protected communication between said mobile terminal and said mobile communication network, and
wherein said mobile terminal comprises hardware means or a combination of hardware and software means.

20. The mobile terminal of claim 19 wherein said means for generating said algorithm-specific security key is provided as a software upgrade in said mobile terminal for execution by a processing hardware in said mobile terminal.

21. The mobile terminal of claim 19, key-modifying function is a one-way function.

22. A network node for operation in a mobile communications network that supports at least one basic cryptographic security algorithm for protected communication in said mobile communications network, said mobile communications network having a network side for serving a mobile terminal, said network node comprising:
means for receiving a list of at least one enhanced version, supported by said mobile terminal, of said at least one basic cryptographic security algorithm from said mobile terminal;
means for selecting an enhanced version of said at least one basic cryptographic security algorithm for communication between said mobile terminal and said network side based on said list of at least one enhanced version, supported by said mobile terminal, of said at least one basic cryptographic security algorithm and a list of at least one enhanced version, allowed by said network side, of said at least one basic cryptographic security algorithm; and
means for transmitting information representative of said selected enhanced version of said at least one basic cryptographic security algorithm from said network side to said mobile terminal to enable said mobile terminal to generate an al algorithm-specific security key by applying a basic security key resulting from a key agreement procedure and said information representative of said selected enhanced version of said at least one basic cryptographic security algorithm as inputs to a key-modifying function which generates said algorithm-specific security key based on said basic security key and said information applied as inputs and apply said algorithm-specific security key as key input to said at least one basic cryptographic security algorithm for protected communication between said mobile terminal and said network side in said mobile communications network,
wherein said at least one basic cryptographic security algorithm together with said algorithm-specific security key correspond to said selected enhanced version of said at least one basic cryptographic security algorithm,
wherein both said basic security key and said algorithm-specific security key are valid for protected communication between said mobile terminal and said mobile communication network, and
wherein said network node comprises hardware means or a combination of hardware and software means.

23. The network node of claim 22, key-modifying function is a one-way function.

24. In an arrangement in which a mobile terminal receives wireless communication services from a wireless network, a method to operate said mobile terminal, comprising:

said mobile terminal generating a basic security key by performing an authenticate and key agreement (AKA) procedure using a shared key as an input to said AKA procedure, both said shared key and said AKA procedure being common to said mobile terminal and said wireless network;

said mobile terminal transferring a list of one or more security algorithms supported by said mobile terminal to said wireless network, each of said one or more security algorithms being a data transformation algorithm that transforms input data to output data in which said transformation is dependent on a key input to said data transformation algorithm;

said mobile terminal receiving selection information from said wireless network indicating a selection of one of said one or more security algorithms;

said mobile terminal generating an algorithm-specific security key by applying said basic security key and said selection information as inputs to a key-modifying function which generates said algorithm-specific security key based on aid basic security key and said selection information applied as inputs; and said mobile terminal applying said algorithm-specific security key as said key input to said selected data transformation algorithm for communication between said mobile terminal and said wireless network;

wherein both said basic and algorithm-specific keys are valid for protected communication between said mobile terminal and said wireless network.

25. The method of claim 24, wherein said key-modifying function is a one-way function.

26. The method of claim 25, wherein said one-way function is provided in software to be executed by a processing hardware of said mobile terminal.

27. The method of claim 24, wherein said step of said mobile terminal generating said basic security key by performing said authenticate and key agreement (AKA) procedure also authenticates said mobile terminal to said wireless network, and wherein said step of said mobile terminal transferring said list of one or more security cryptographic algorithms to said wireless network is performed after said mobile terminal is authenticated to said wireless network.

* * * * *